(12) United States Patent
Zhang et al.

(10) Patent No.: US 9,094,093 B2
(45) Date of Patent: Jul. 28, 2015

(54) METHOD, APPARATUS AND DEVICE FOR RELAY USER SELECTION AND DOWNLINK RESOURCE ALLOCATION

(75) Inventors: Xiaobo Zhang, Shanghai (CN); Mingli You, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 724 days.

(21) Appl. No.: 13/264,540

(22) PCT Filed: Apr. 17, 2009

(86) PCT No.: PCT/CN2009/000409
§ 371 (c)(1),
(2), (4) Date: Oct. 14, 2011

(87) PCT Pub. No.: WO2010/118558
PCT Pub. Date: Oct. 21, 2010

(65) Prior Publication Data
US 2012/0026936 A1  Feb. 2, 2012

(51) Int. Cl.
| | |
|---|---|
| *H04B 7/14* | (2006.01) |
| *H04W 4/00* | (2009.01) |
| *H04B 7/26* | (2006.01) |
| *H04L 5/00* | (2006.01) |
| *H04W 72/04* | (2009.01) |
| *H04W 84/04* | (2009.01) |

(52) U.S. Cl.
CPC ............ *H04B 7/2606* (2013.01); *H04L 5/0044* (2013.01); *H04L 5/0048* (2013.01); *H04L 5/0073* (2013.01); *H04W 72/044* (2013.01); *H04W 84/047* (2013.01)

(58) Field of Classification Search
None
See application file for complete search history.

(56) References Cited

U.S. PATENT DOCUMENTS

| | | | |
|---|---|---|---|
| 7,619,998 | B2 | 11/2009 | Takeda et al. |
| 8,073,061 | B2 | 12/2011 | Horiuchi et al. |
| 8,437,691 | B2 | 5/2013 | Saitou et al. |
| 2008/0025251 | A1 | 1/2008 | Lee et al. |
| 2008/0056175 | A1 | 3/2008 | Jung et al. |
| 2009/0176492 | A1* | 7/2009 | Kwon et al. .............. 455/436 |
| 2009/0219854 | A1 | 9/2009 | Okuda |

(Continued)

FOREIGN PATENT DOCUMENTS

| | | |
|---|---|---|
| CN | 101064901 A | 10/2007 |
| CN | 101119153 A | 2/2008 |

(Continued)

OTHER PUBLICATIONS

International Search Report for PCT/CN2009/000409 dated Jan. 21, 2010.
"Decode and Forward Relays for E-UTRA enhancements," Texas Instruments, 3GPP TSG RAN WG1, #54bis, R1-083533, Sep. 29-Oct. 3, 2008, pp. 1-5, Prague, Czech Republic.

(Continued)

*Primary Examiner* — Christine Duong
(74) *Attorney, Agent, or Firm* — Fay Sharpe LLP (57) ABSTRACT

The present invention proposes a method, apparatus and device for relay user selection and downlink resource allocation in a base station of a relay communication system. Specifically the base station performs relay user selection and downlink resource allocation according to a pattern of a cell-specific reference signal thereof and/or a reception demodulation scheme of a mobile terminal. With the method, apparatus or device according to the invention, it is possible to alleviate and even eliminate influence of overlapping cell-specific reference signals upon the performance of reception demodulation at a user terminal.

5 Claims, 7 Drawing Sheets

(56) References Cited

U.S. PATENT DOCUMENTS

2010/0022184 A1* 1/2010 Khoshnevis et al. ............. 455/7
2012/0134316 A1* 5/2012 Seo et al. ...................... 370/315

FOREIGN PATENT DOCUMENTS

| | | |
|---|---|---|
| CN | 101304304 A | 11/2008 |
| JP | 2004-254237 A | 9/2004 |
| JP | 2009-231990 A | 10/2009 |
| WO | WO 2006/035902 A1 | 4/2006 |

OTHER PUBLICATIONS

"Evolved Universal Terrestrial Radio Access (e-UTRA); Physical Channels and Modulation," 3GPP TS 36.211, V8.5.0, Dec. 2008, pp. 1-41.

"Evolved Universal Terrestrial Radio Access (e-UTRA); Physical Channels and Modulation," 3GPP TS 36.211, V8.5.0, Dec. 2008, pp. 1-82.

"Time synchronization requirements for different LTE-A techniques," Qualcomm Europe, 3GPP TSG RAN WG1, #56bis, R1-091471, Mar. 23-Mar. 27, 2009, pp. 1-4, Seoul, South Korea.

* cited by examiner

METHOD, APPARATUS AND DEVICE FOR RELAY USER SELECTION AND DOWNLINK RESOURCE ALLOCATION

FIELD OF THE INVENTION

The present invention relates to a relay communication system and in particular to a technology of relay user selection and downlink resource allocation in a relay communication system.

BACKGROUND OF THE INVENTION

An existing LTE system uses a Cell-specific Reference Signal (CRS) for detection and demodulation of a downlink channel. As described in the 3GPP TS36.211 (v8.5.0) protocol, the cell-specific reference signal covers the entire bandwidth of a cell and is transmitted at the same power, and all the users served by the cell know the cell-specific reference signal of the cell. Therefore, the users generally can use the cell-specific reference signal as channel estimation.

Figure 1:
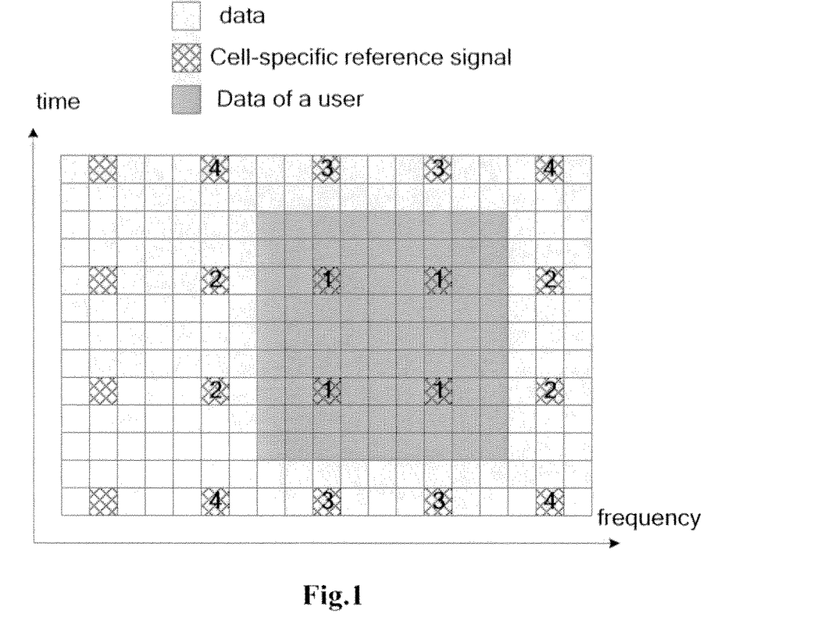
FIG. 1 illustrates an illustrative pattern cell-specific reference signal for channel estimation.

Generally a cell-specific reference signal used by a user for channel detection includes both a cell-specific reference signal in a resource block thereof and a cell-specific reference signal beyond the resource block thereof as a part of a reception demodulation scheme in order to improve the quality of data reception. As illustrated in FIG. 1, a white blank square box represents a resource unit of data, a square box with netted patterns represents a resource unit of a cell-specific reference signal, a gray zone represents a resource block allocated to a user, and a square box denoted with 1 represents a resource unit of a cell-specific reference signal in the resource block, square boxes denoted with 2, 3 and 4 represent resource units of cell-specific reference signals adjacent to the resource block. For data demodulation, a set of cell-specific reference signals that can be used by the user for channel estimation includes signals of the resource units denoted with 1 and 2, signals of the resource units denoted with 1 and 3, signals of the resource units denoted with 1, 2 and 3, signals of the resource units denoted with 1, 2, 3 and 4, etc. A corresponding two-dimension filtering algorithm can be found in the article *Robust Channel Estimation for OFDM Systems with Rapid Dispersive Fading Channels* by Ye Li, L. J. Cimini, and N R. Sollenberger in IEEE Trans. Commun., vol. 46, No. 7, pp. 902-915, July 1998. However, channel estimation may suffer from an error when the resource unit of the cell-specific reference signal beyond the resource block is corrupted by a cell-specific reference signal transmitted from a relay station.

As specified in the latest relay protocol, a transparent relay will be included in the LTE-A specification, that is, the relay will transmit a cell-specific reference signal in the same resource unit as a base station. The relay station will transmit a cell-specific reference signal and a physical downlink control channel over the entire bandwidth for demodulation at a relay user.

Figure 2:
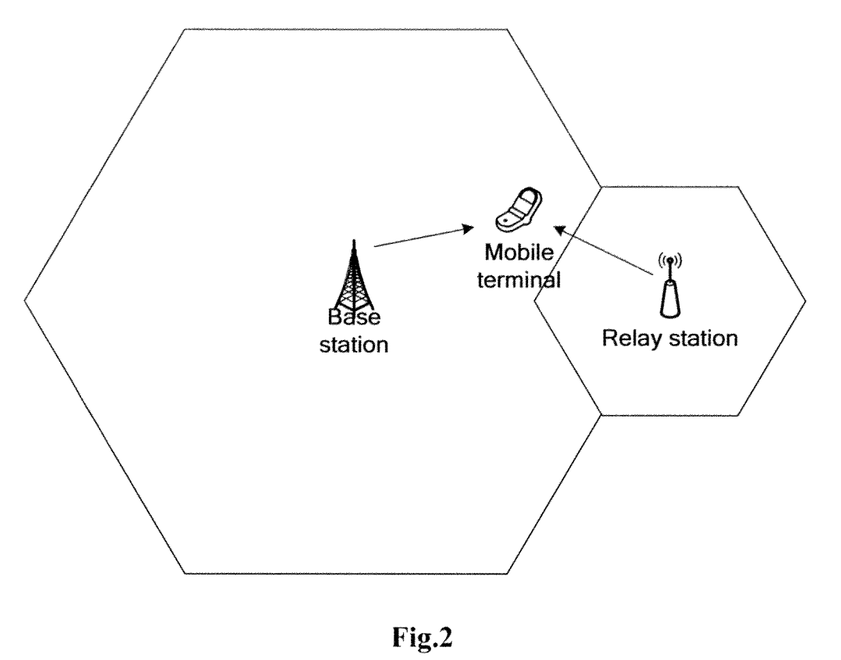
FIG. 2 illustrates a schematic diagram of a mobile terminal receiving cell-specific reference signals from a base station and a relay station.

As described previously, a cell-specific reference signal used by a user for channel estimation typically includes a cell-specific reference signal in a resource block thereof and a cell-specific reference signal beyond the resource block thereof in order to improve the performance of channel estimation. As illustrated in FIG. 2, a user of a base station receives both a cell-specific reference signal from the base station and a cell-specific reference signal from a relay station. When downlink frequency bands of the base station and the relay station are adjacent, a cell-specific reference signal used by the user to demodulate received data may include the cell-specific reference signal transmitted from the base station and the cell-specific reference signal transmitted from the relay station, both of which overlap with each other, thus degrading the performance of reception demodulation.

SUMMARY OF THE INVENTION

A general object of the invention is to address the foregoing problem present in the prior art.

In the invention, a user served directly by a base station is referred to as a base station user, and a user served by a relay station is referred to as a relay user or a relay station user. A cell-specific reference signal transmitted from the base station is referred simply to as a cell-specific reference signal of the base station, and a cell-specific reference signal transmitted from the relay station is referred simply to as a cell-specific reference signal of the relay station.

For a downlink shared physical channel, the base station will transmit the cell-specific reference signal over the entire frequency band, and there area number of candidate schemes for a bandwidth occupied by the cell-specific reference signal transmitted from the relay station.

There may be the following three scenarios for bandwidths occupied for the cell-specific reference signal and a data signal of the relay station which are transmitted at a single carrier frequency:

In a first scenario, the data signal of the relay station occupies the entire bandwidth, and the cell-specific reference signal of the relay station also occupies the entire bandwidth;

In a second scenario, the data signal of the relay station occupies a part bandwidth, and the cell-specific reference signal of the relay station occupies the entire bandwidth; and at this time the cell-specific reference signal of the relay station also occupies the entire bandwidths of the base station and the relay station overlap over the entire bandwidth so that the relay user can perform channel estimation over the entire bandwidth; and In a third scenario, both the data signal and the cell-specific reference signal of the relay station occupy only the part of the bandwidth allocated to the relay station.

Also there may be the following three scenarios for bandwidths occupied for the cell-specific reference signal and the data signal of the relay station when being extended to transmission at multiple carrier frequencies:

In a fourth scenario, the data signal of the relay station occupies the entire frequency band, and the cell-specific reference signal of the relay station also occupies the entire frequency hand;

In a fifth scenario, the data signal of the relay station occupies a part of the frequency hand, and the cell-specific reference signal of the relay station occupies the entire frequency band; and In a sixth scenario, both the data signal and the cell-specific reference signal of the relay station occupy only the part of the frequency band allocated to the relay station.

Figure 3:
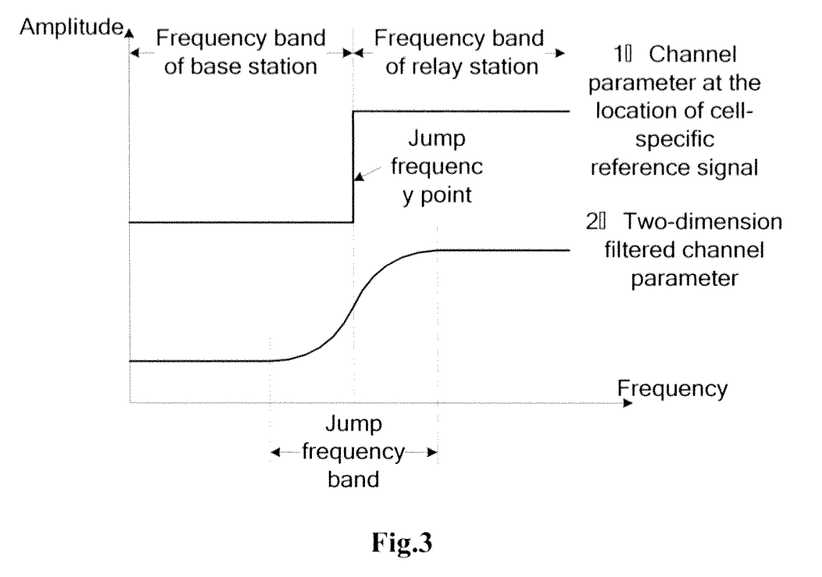
FIG. 3 illustrates a schematic diagram of a channel parameter derived by a mobile terminal jumping between a frequency band of a base station and a frequency band of a relay station.

When the frequency bands/bandwidths occupied by the cell-specific reference signal and the data signal of the relay station satisfy the foregoing third and sixth scenarios, if the base station user is close to a service area of the relay station, the level of the cell-specific reference signal received by the base station user over the frequency band of the relay station will be significantly enhanced because the cell-specific reference signal of the base station and the cell-specific reference signal of the relay station overlap as illustrated in the curve 1 of FIG. 3. Therefore "a jump frequency point" of a channel parameter will be detected in the cell-specific reference signals at the edges of the frequency band of the base station and of the frequency band of the relay station and spread to a "jump frequency band" after two-dimension filtering as illustrated in the curve 2 of FIG. 3. Therefore both the base station user and the relay station user will be influenced while detecting data over the "jump frequency band".

When the frequency bands/bandwidths occupied by the cell-specific reference signal and the data signal of the relay station satisfy the foregoing second, fifth and sixth scenarios, a user close to the service area of the relay station will suffer from interference due to the cell-specific reference signal of the base station overlapping with the cell-specific reference signal of the relay station.

For the relay user, the relay user use the overlapping cell-specific reference signals for channel estimation and detection, and interference will not occur if the base station and the relay station are coordinated to transmit downlink data for the relay user or will occur if the base station transmits no coordinated data. However interference will not be very significant because the user is close to the relay station and the power of the cell-specific reference signal of the base station is lower than that of the cell-specific reference signal of the relay station.

For the base station user, the channel parameter derived by the base station user is $h=h_1+h_2$, where $h_1$ and $h_2$ represent a parameter of a channel from the base station to the base station user and a parameter of a channel from the relay station to the base station user respectively. Data received by the base station user is $y=h_1s$, where y and s represent a transmitted signal and a receive signal respectively. When the base station user is close to the service area of the relay station, $h_2$ can not be neglected, and an unacceptable error will arise if the transmitted data s is recovered with h.

In order to address the foregoing problems, the invention proposes a method for relay user selection and downlink resource allocation in a relay communication system.

According to a first aspect of the invention, there is provided a method for relay user selection and downlink resource allocation in a base station of a relay communication system, wherein the base station determines a relay user and performs downlink resource allocation according to a pattern of a cell-specific reference signal thereof and/or a reception demodulation scheme of a mobile terminal.

According to a second aspect of the invention, there is provided a processing apparatus for relay user selection and downlink resource allocation in a base station of a relay communication system, wherein the processing apparatus determines a relay user and performs downlink resource allocation according to a pattern of a cell-specific reference signal thereof and/or a reception demodulation scheme of a mobile terminal.

According to a third aspect of the invention, there is provided a base station for a relay communication system, which includes the processing apparatus according to the second aspect of the invention.

With the method, apparatus or device according to the invention, it is possible to alleviate and even eliminate influence of overlapping cell-specific signals upon the performance of reception demodulation at a user terminal.

BRIEF DESCRIPTION OF THE DRAWING

The other features, objects and advantages of the invention will become more apparent upon reading the following detailed description of non-limiting embodiments with reference to the drawings in which.

Identical or like reference numerals will denote identical or like step features or means (modules).

DETAILED DESCRIPTION OF THE INVENTION

Figure 4:
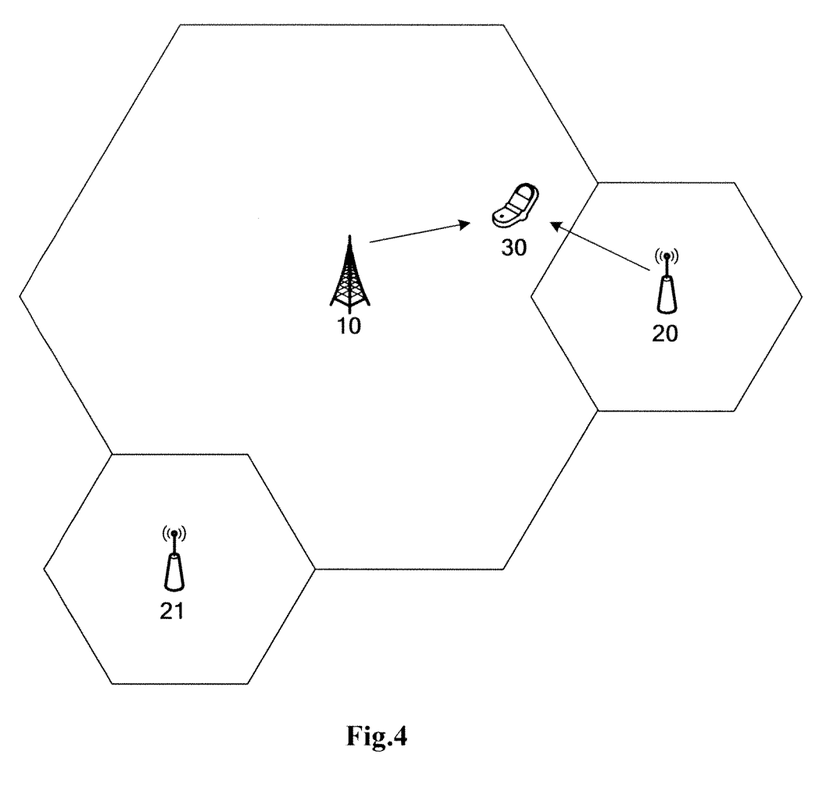
FIG. 4 illustrates a schematic diagram of a relay communication system according; to an embodiment of the invention.

FIG. 4 illustrates a schematic diagram of a relay communication system according to an embodiment of the invention. As illustrated in FIG. 4, the relay communication system according to the present embodiment includes a base station 10, a relay station 20, a relay station 21 and a mobile terminal 30. The relay stations 20 and 21 are located in a service area of the base station 10. Since the transmission power of a relay station is typically lower than that of a base station, service areas of both the relay stations 20 and 21 are smaller than that of the base station 10.

Respective illustrative embodiments of the invention will be described hereinafter with reference to FIG. 4.

The First Embodiment

Figure 5:
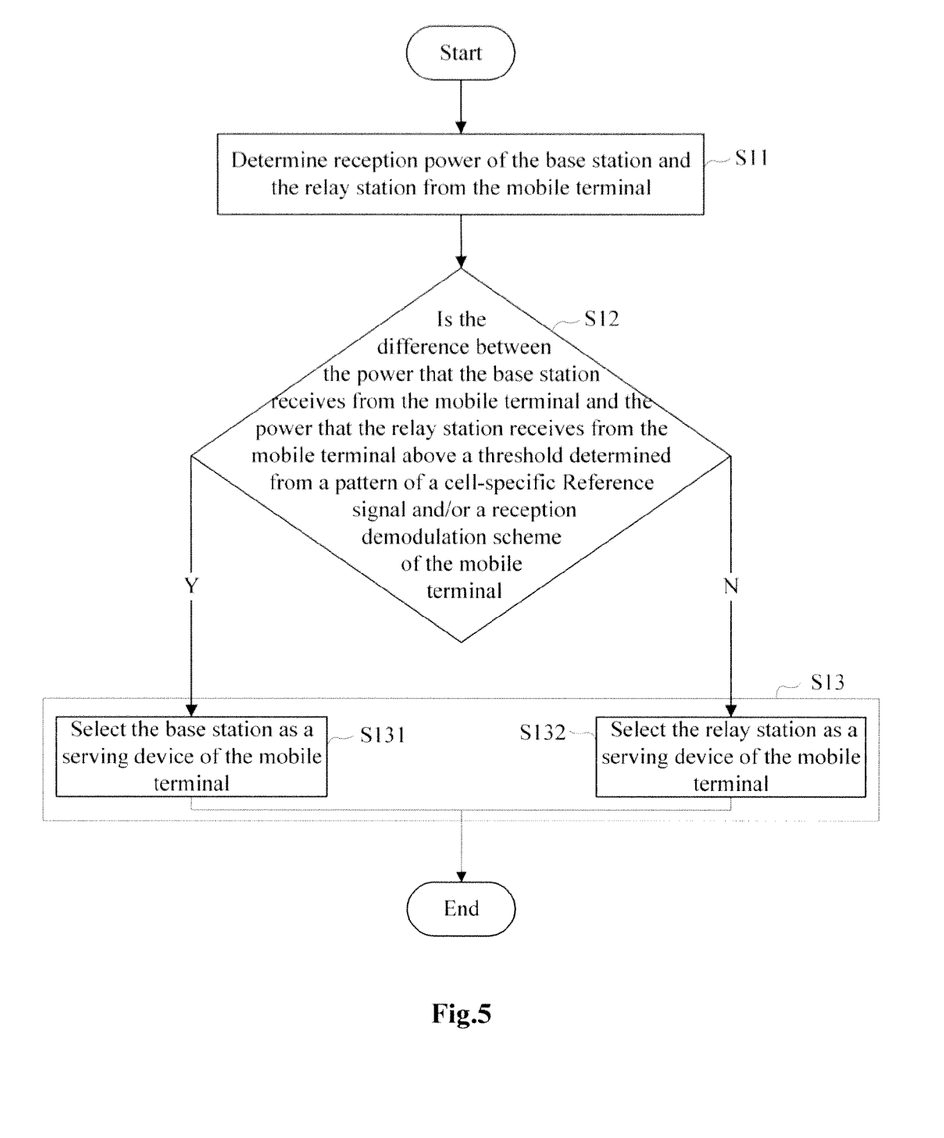
FIG. 5 illustrates a flow chart of a method, in a base station of a relay communication system, for selecting from the base station and a relay station thereof a serving device for a mobile terminal according to an embodiment of the invention.

FIG. 5 illustrates a flow chart of a method, in a base station of a relay communication system, for selecting from the base station and a relay station thereof a serving device for a mobile terminal according to an embodiment of the invention. The embodiment will be described below based upon the base station 10, the relay station 20 and the mobile terminal 30 with reference to FIG. 5.

Firstly in the step S11, the base station 10 will determine reception power thereof from the mobile terminal 30 and reception power of the relay station 20 from the mobile terminal 30, where the base station 10 acquires the reception power of the relay station 20 from the mobile terminal 30 by exchanging control information with the relay station 20.

Then in the step S12, the base station 12 compares the difference between the power that it receives from the mobile terminal 30 and the power that the relay station 20 receives from the mobile terminal 30 with a threshold. The threshold here is determined from a pattern of a cell-specific reference signal of the base station 10 and/or a reception demodulation scheme of the mobile terminal 30.

In the prior art, a relay user may be selected in view of the reception power of the base station 10 and the relay station 20 from the mobile terminal 30. However in the prior art, the relay user is selected taking into no account the pattern of the cell-specific reference signal of the base station 10 and/or the reception demodulation scheme of the mobile terminal 30, particularly a channel detection scheme used based upon a cell-specific reference signal by the mobile terminal 30 during reception demodulation and possibly consequential interference due to the cell-specific reference signal transmitted from the base station 10 overlapping with a cell-specific reference signal transmitted from the relay station 20.

In view of the foregoing problem in the prior art, the threshold in the step S12 includes a tolerance item determined from the pattern of the cell-specific reference signal of the base station 10 and/or the reception demodulation scheme of the mobile terminal 30. The tolerance item is related to the reception demodulation scheme of the mobile terminal 30, particularly to the channel detection scheme used based upon a cell-specific reference signal by the mobile terminal 30. The tolerance item can be introduced so that the service area of the relay station 20 is larger than that in the prior art, thereby reducing interference to a base station user close to the service area of the relay station due to the overlapping cell-specific reference signals.

In the step S13, the base station 10 will select a serving device of the mobile terminal 30 according to the result of comparison in the step S12. Specifically in the sub-step S131, if the difference between the power that the base station 10 receives from the mobile terminal 30 and the power that the relay station 20 receives from the mobile terminal 30 is above the threshold, then the base station 10 is selected as a serving device of the mobile terminal 30; and in the sub-step S132, if the difference between the power that the base station 10 receives from the mobile terminal 30 and the power that the relay station 20 receives from the mobile terminal 30 is below or equal to the threshold, then the relay station 20 is selected as a serving device of the mobile terminal 30.

According to a variation of the present embodiment, the base station 10 will further perform the step of comparing power that a plurality of relay stations thereof receive from the mobile terminal 30 with each other and determine one of the relay stations that receives the highest power from the mobile terminal 30. Specifically, the base station 10 acquires the reception power of the relay station 20 from the mobile terminal 30 and reception power of the relay s icon 21 from the mobile terminal 30 by exchanging control information with the relay stations 20 and 21 and determines from comparison thereof that the reception power of the relay station 20 from the mobile terminal 30 is higher than the reception power of the relay station 21 from the mobile terminal 30. With the steps S11 to S13, the base station 10 will select a serving device of the mobile terminal 30 from the base station 10 and the one of the relay stations that receives the highest power from the mobile terminal 30.

Some relay stations only amplify and forward a received signal. Other relay stations will demodulate, modulate again and forward a received signal. Therefore preferably the present embodiment further includes such a step that the base station 10 will transmit a control instruction to the relay station 20 to instruct the relay station 20 to transmit the cell-specific reference signal in a downlink resource block thereof in the same pattern as the pattern of the cell-specific reference signal of the base station 10.

Optionally in the step S11, the reception power of the base station 10 from the mobile terminal 30 is derived from downlink transmission power at which the base station 10 transmits a downlink signal to the mobile terminal 30, and the reception power of the relay station 20 from the mobile terminal 30 is derived from downlink transmission power at which the relay station 20 transmits a downlink signal to the mobile terminal 30. Typically such inversion derivation can be used in a TDD system because parameters, e.g., a channel response, a path loss, etc., in the uplink, can be considered the same as a channel response, a path loss, etc., in the downlink in the TDD system.

The Second Embodiment

Figure 6:
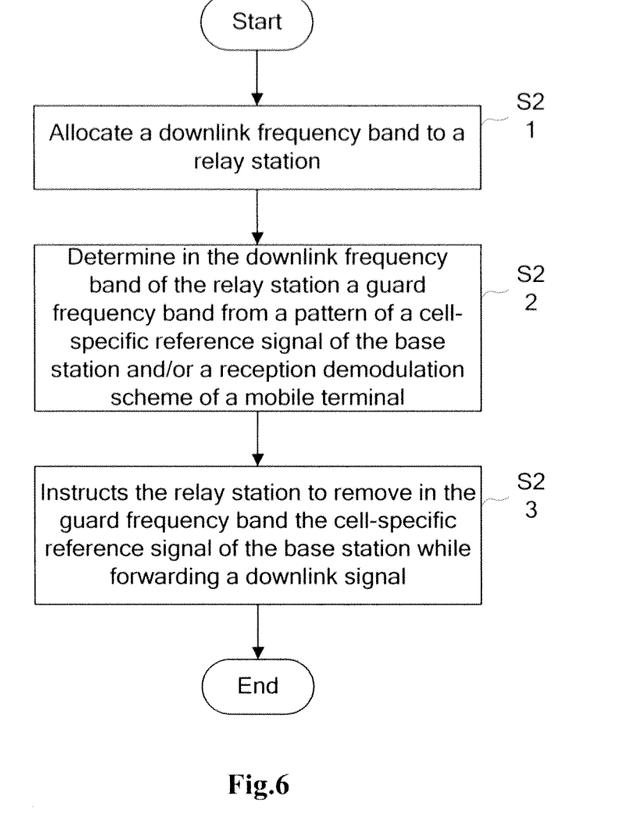
FIG. 6 illustrates a flow chart of a method for downlink resource allocation in a base station of a relay communication system according to an embodiment of the invention.
Figure 7:
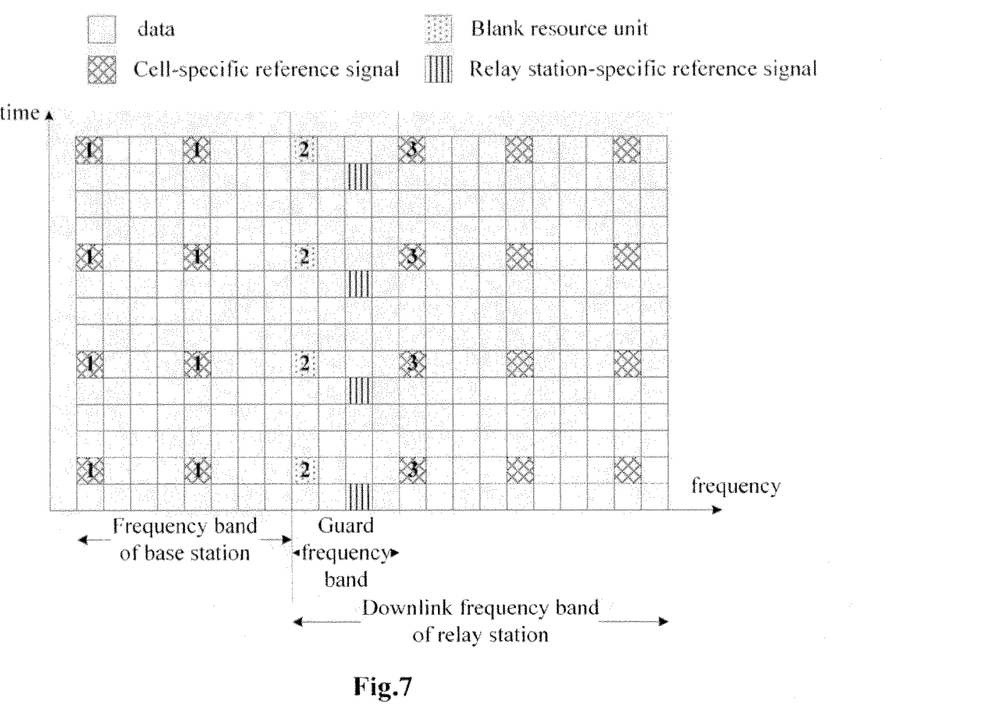
FIG. 7 illustrates a schematic diagram of a cell-specific reference signal in a downlink frequency band of a relay station according to an embodiment of the invention.

FIG. 6 illustrates a now chart of a method for downlink resource allocation in a base station of a relay communication system according to an embodiment of the invention. FIG. 7 illustrates a schematic diagram of a cell-specific reference signal in a downlink frequency band of a relay station according to an embodiment of the invention, where a white blank square box represents a resource unit of data, a square box with netted patterns represents a resource unit of a cell-specific reference signal, a square box with dotted patterns represents a blank resource unit, and a square box with vertical strips represents a resource unit of a relay station-specific reference signal. The embodiment will be described below based upon the base station 10 and the relay station 20 with reference to FIG. 6 and FIG. 7.

Firstly in the step S21, the base station 10 allocates a downlink frequency band to the base station 20 as illustrated in FIG. 7, for example.

In the step S22, the base station 10 determines in the downlink frequency band of the base station 20 a guard frequency band from a pattern of a cell-specific reference signal of the base station 10 and/or a reception demodulation scheme of a mobile terminal in the cell. As illustrated in FIG. 7, for example, the guard frequency band is located at the edge of the downlink frequency band of the base station 20.

In the step S23, the base station 10 instructs the relay station 20 to remove in the guard frequency band thereof the cell-specific reference signal of the base station 10 while forwarding a downlink signal. As illustrated in FIG. 7, for example, square boxes with dotted patterns and denoted with 2 in the guard frequency band of the relay station 20 represent white blank resource units originally used for transmission of a cell-specific reference signal, and the base station 10 will instruct the relay station 20 to remove patterns of cell-specific reference signals of these resource units while forwarding downlink data. The relay station 20 will not transmit any signal in these resource units denoted with 2 while forwarding downlink data in response to the instruction of the base station 10.

Figure 8:
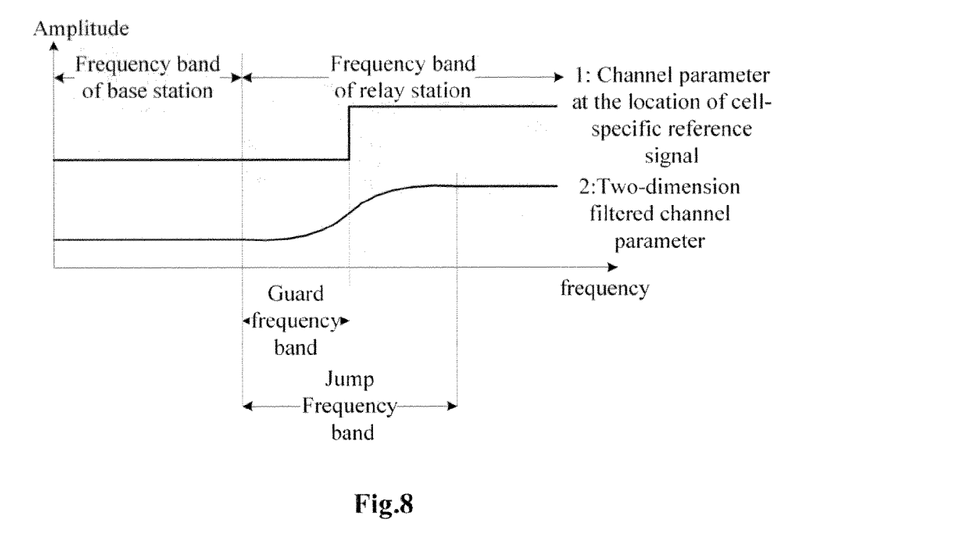
FIG. 8 illustrates a schematic diagram of a channel parameter derived by a mobile terminal jumping between the frequency band of a base station and a frequency band of a relay station according to an embodiment of the invention.

With an application of the method according to the present embodiment, for a base station user with a downlink frequency band located in the frequency band of the base station illustrated in FIG. 7, when the relay station 20 transmits the cell-specific reference signal only over the downlink frequency band, if a cell-specific reference signal used for channel detection in the reception demodulation scheme of the base station user includes cell-specific reference signals in the resource units denoted with 1, 2 and 3, then curves 1 and 2 in FIG. 8 illustrate a channel parameter detected at the location of the cell-specific reference signal and the channel parameter subject to two-dimension filtering respectively, which show that the channel parameter derived by the base station user will still suffer somewhat from influence due to the overlapping cell-specific reference signals over a jump frequency band; and if the cell-specific reference signal used for channel detection in a reception demodulation scheme of the base station user includes the cell-specific reference signals in the resource units denoted with 1 and 2 but not the cell-specific reference signal in the resource unit denoted with 3, then the channel parameter derived by the base station user will not suffer from any influence due to the overlapping cell-specific reference signals. Therefore optionally in the step S22, the base station 10 will further determine a minimum guard bandwidth from the reception demodulation scheme used for the mobile terminal in the cell, and the bandwidth of the guard frequency band in the downlink frequency band of the relay station 20 will not be smaller than this minimum guard bandwidth. Specifically, the minimum guard bandwidth is equal to the maximum frequency interval between a cell-specific reference signal used by a user for channel detection beyond a downlink resource block thereof and the downlink resource block thereof, for example.

Optionally following the step S22, the base station will further perform the step of instructing the relay station 20 to transmit a relay station-specific reference signal for downlink data demodulation of the relay station over the guard frequency hand in a different pattern from the pattern of the cell-specific reference signal of the base station 10. As illustrated in FIG. 7, for example, the relay station 20 transmits, in the resource units denoted with vertical strips over the guard frequency hand thereof, relay station-specific reference signals used by the mobile terminal for reception demodulation on data over the guard frequency band. Those skilled in the art shall appreciate that the relay station 20 can alternatively transmit a relay station-specific reference signal over the entire downlink frequency band thereof in a different pattern from the pattern of the cell-specific reference signal of the base station 10.

The Third Embodiment

Figure 9:
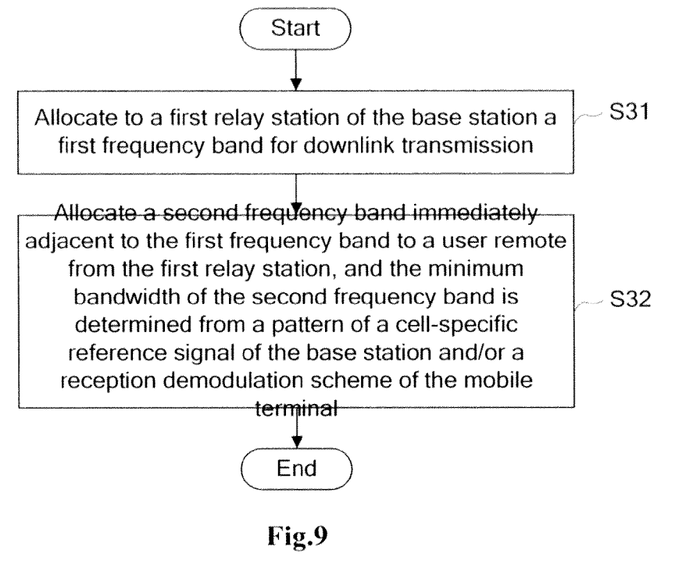
FIG. 9 illustrates a flow chart of a method for downlink resource allocation in a base station of a relay communication system according to an embodiment of the invention.
Figure 10:
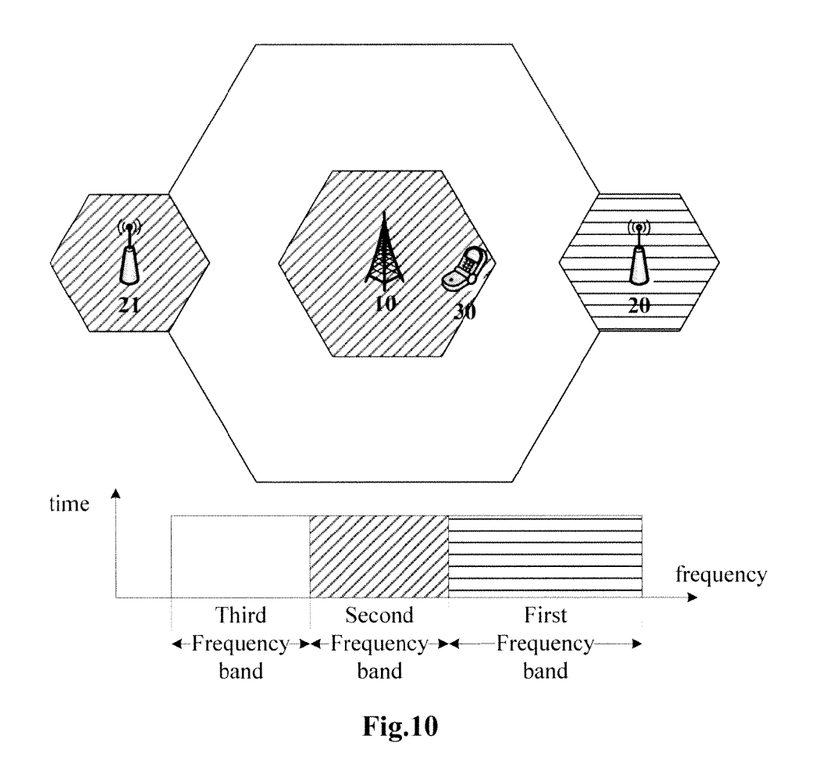
FIG. 10 illustrates a schematic diagram of downlink resource allocation according to an embodiment of the invention.

FIG. 9 illustrates a flow chart of a method for downlink resource allocation in a base station of a relay communication system according to an embodiment of the invention. FIG. 10 illustrates a schematic diagram of downlink resource allocation according to an embodiment of the invention. The embodiment will be described below based upon the base station 10, the relay station 20, the relay station 21 and the mobile terminal 30 with reference to FIG. 9 and FIG. 10.

Firstly in the step S31, the base station 10 allocates to its first relay station, e.g., the relay station 20, a first frequency band for downlink transmission. As illustrated in FIG. 10, for example, the first frequency band denoted with horizontal strips is allocated to the relay station 20 for downlink transmission.

In the step S32, the base station 10 allocates a second frequency band immediately adjacent to the first frequency band to a user remote from the first relay station, and the minimum width of the second frequency band is determined from a pattern of a cell-specific reference signal of the base station 10 and/or a reception demodulation scheme of the mobile terminal in the cell. As illustrated in FIG. 10, for example, the second frequency band denoted with slanted strips is allocated to the user remote from the relay station 20. Specifically, the minimum bandwidth of the second frequency band is equal to the maximum frequency interval between a cell-specific reference signal used for channel detection in a reception demodulation scheme of a user beyond a downlink resource block of the user and the downlink resource block thereof, for example.

When the respective relay stations transmit cell-specific reference signals only over their respective downlink frequency bands, the user for which the second frequency band is used is remote from the relay station 20, so the user and a user served by the relay station 20 will suffer from little interference due to the overlapping cell-specific reference signals during reception demodulation. Also the minimum bandwidth of the second frequency hand is determined from the reception demodulation scheme of the user in the cell so that a cell-specific reference signal used for channel detection of the user for which the first frequency hand is used will not go beyond the first and second frequency bands. As illustrated in FIG. 10, tar example, a third frequency band is immediately adjacent to the second frequency band on the other side opposite to the first frequency hand, and no matter whichever user the third frequency band is allocated, a user for which the third frequency band is used and the user for which the first frequency band is used will not suffer from any interference due to their cell-specific reference signals overlapping with each other during reception demodulation.

The user to which the second frequency hand is allocated for use can be a base station user or a relay station user. The step S32 will particularly be performed differently dependent upon the different user to which the second frequency band is allocated for use.

If the user to which the second frequency band is allocated for use is a relay station user, then the base station 10 allocates the second frequency band directly to the relay station serving the user. In the step S32, if the distance of a second relay station to a first relay station of the base station 10 is below a distance threshold, then the base station 10 allocates the second frequency band to the second relay station. For example, the distance of the relay station 21 to the relay station 20 is above a threshold, the base station 10 allocates the second frequency band to the relay station 21. The distance threshold here is for the purpose of ensuring sufficiently small influence of the cell-specific reference signal of the relay stations 20 and 21 upon the performance of reception demodulation of the user served by the other relay station.

If the user to which the second frequency band is allocated for use is a base station user, then the base station 10 will further judge a condition of the user. In the step S32, if the distance of a mobile terminal, e.g., the mobile terminal 30, to the base station 10 is below a distance threshold or power that the base station 10 receives from the mobile terminal is above a power threshold, then the base station 10 allocates the second frequency band to the mobile terminal. Both the distance threshold and the power threshold here are for the purpose of ensuring sufficiently small influence of the cell-specific reference signal of the relay station 20 upon the performance of reception demodulation of the user to which the second frequency hand is allocated. More particularly, both the distance threshold and the power threshold here are determined from the cell-specific reference signal of the base station 10 and/or the reception demodulation scheme of the mobile terminal 30.

The Fourth Embodiment

Figure 11:
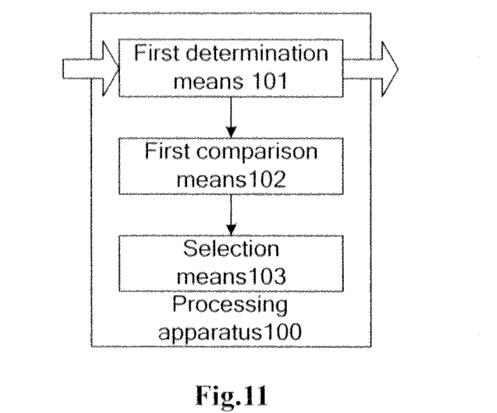
FIG. 11 illustrates a structural block diagram of a processing apparatus in a base station of a relay communication system according to an embodiment of the invention.

FIG. 11 illustrates a structural block diagram of a processing apparatus in a base station of a relay communication system according to an embodiment of the invention. As illustrated in FIG. 11, the processing apparatus 100 according to the embodiment includes first determination means 101, first comparison means 102 and selection means 103. Typically the processing apparatus 100 is arranged in the base station 10. The embodiment will be described below based upon the base station 10, the relay station 20, the mobile terminal 30 and the processing apparatus 100 with reference to FIG. 11.

Firstly the first determination means 101 in the processing apparatus 100 will determine reception power of the base station 10 from the mobile terminal 30 and reception power of the relay station 20 from the mobile terminal 30, where the first determination means 101 acquires the reception power of the relay station 20 from the mobile terminal 30 by exchanging control information with the relay station 20.

Then the first comparison means 102 in the processing apparatus 100 compares the difference between the power that the base station 100 receives from the mobile terminal 30 and the power that the relay station 20 receives from the mobile terminal 30, both of which are determined by the first determination means 101, with a threshold. The threshold here is determined from a pattern of a cell-specific reference signal of the base station 10 and/or a reception demodulation scheme of the mobile terminal 30.

In the prior art, a relay user may be selected in view of the reception power of the base station 10 and the relay station 20 from the mobile terminal 30. However in the prior art, the relay user is selected taking into no account the pattern of the cell-specific reference signal of the base station 10 and/or the reception demodulation scheme of the mobile terminal 30, particularly a channel detection scheme used based upon a cell-specific reference signal by the mobile terminal 30 during reception demodulation and possibly consequential interference due to the cell-specific reference signal transmitted from the base station 10 overlapping with a cell-specific reference signal transmitted from the relay station 20.

In view of the foregoing problem in the prior art, the threshold used in the first comparison means 102 includes a tolerance item determined from the pattern of the cell-specific reference signal of the base station 10 and/or the reception demodulation scheme of the mobile terminal 30. The tolerance item is related to the reception demodulation scheme of the mobile terminal 30, particularly to the channel detection scheme used based upon a cell-specific reference signal by the mobile terminal 30. The tolerance item can be introduced so that the service area of the relay station 20 is larger than that in the prior art, thereby reducing interference to a base station user close to the service area of the relay station due to the overlapping cell-specific reference signals.

Next, the selection means 103 in the processing apparatus 100 will select a serving device of the mobile terminal 30 according to the result of comparison of the first comparison means 102. Specifically, if the difference between the power that the base station 10 receives from the mobile terminal 30 and the power that the relay station 20 receives from the mobile terminal 30 is above the threshold, then the selection means 103 selects the base station 10 as a serving device of the mobile terminal 30; and if the difference between the power that the base station 10 receives from the mobile terminal 30 and the power that the relay station 20 receives from the mobile terminal 30 is below or equal to the threshold, then the selection means 103 selects the relay station 20 as a serving device of the mobile terminal 30.

According to a variation of the present embodiment, the processing apparatus 100 is further configured to compare power that a plurality of relay stations of the base station 10 receive from the mobile terminal 30 with each other and to determine one of the relay stations that receives the highest power from the mobile terminal 30. Specifically, the first determination means 101 acquires the reception power of the relay station 20 from the mobile terminal 30 and reception power of the relay station 21 from the mobile terminal 30 by exchanging control information with the relay stations 20 and 21 and determines from comparison thereof that the reception power of the relay station 20 from the mobile terminal 30 is higher than the reception power of the relay station 21 from the mobile terminal 30. With the operations performed by the first determination means 101, the first comparison means 102 and the selection means 103, the processing apparatus 100 will select a serving device of the mobile terminal 30 from the base station 10 and the one of the relay stations that receives the highest power from the mobile terminal 30.

Some relay stations only amplify and forward a received signal. Other relay stations will demodulate, modulate again and forward a received signal. Therefore preferably the processing apparatus 100 according to the present embodiment further includes first instruction means configured to transmit a control instruction to the relay station 20 to instruct the relay station 20 to transmit the cell-specific reference signal in its downlink resource block in the same pattern as the pattern of the cell-specific reference signal of the base station 10.

Optionally, the first determination means 101 derives, the reception power of the base station 10 from the mobile terminal 30, from downlink transmission power at which the base station 10 transmits a downlink signal to the mobile terminal 30, and derives, the reception power of the relay station 20 from the mobile terminal 30, from downlink transmission power at which the relay station 200 transmits a downlink signal to the mobile terminal 30. Typically such inversion derivation can be used in a TDD system because parameters, e.g., a channel response, a path loss, etc., in the uplink, can be considered the same as a channel response, a path loss, etc., in the downlink in the TDD system.

The Fifth Embodiment

Figure 12:
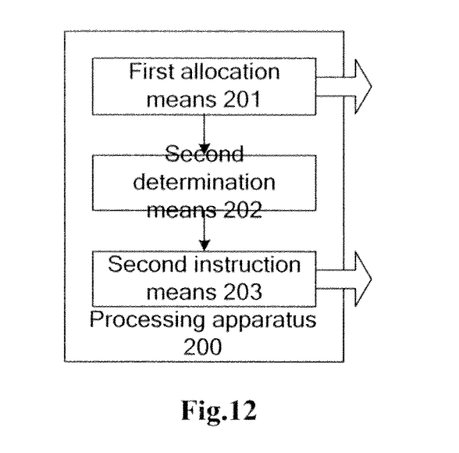
FIG. 12 illustrates a structural block diagram of a processing apparatus in a base station of a relay communication system according to an embodiment of the invention.

FIG. 12 illustrates a structural block diagram of a processing apparatus in a base station of a relay communication system according to an embodiment of the invention. As illustrated in FIG. 12, the processing apparatus 200 according to the embodiment includes first allocation means 201, second determination means 202 and second instruction means 203. Typically the processing apparatus 200 is arranged in the base station 10. The embodiment will be described below based upon the base station 10, the relay station 20 and the processing apparatus 200 with reference to FIG. 7 and FIG. 11.

Firstly, the first allocation means 201 in the processing apparatus 200 allocates a downlink frequency band to the base station 20 as illustrated in FIG. 7, for example.

Then, the second determination means 202 in the processing apparatus 200 determines in the downlink frequency band of the base station 20 a guard frequency band from a pattern of a cell-specific reference signal of the base station 10 and/or a reception demodulation scheme of a mobile terminal in the cell. As illustrated in FIG. 7, for example, the guard frequency band is located at the edge of the downlink frequency band of the base station 20.

Next, the second instruction means 203 in the processing apparatus 200 instructs the relay station 20 to remove in its guard frequency band the cell-specific reference signal of the base station 10 while forwarding a downlink signal. As illustrated in FIG. 7, for example, square boxes with dotted patterns and denoted with 2 in the guard frequency hand of the relay station 20 represent white blank resource units originally used for transmission of a cell-specific reference signal, and the second instruction means 203 will instruct the relay station 20 to remove patterns of cell-specific reference signals of these resource units while forwarding downlink data. The relay station 20 will not transmit any signal in these resource units denoted with 2 while forwarding downlink data in response to the instruction of the second instruction means 203.

With an application of the device according to the present embodiment, for a base station user with a downlink frequency band located in the frequency band of the base station illustrated in FIG. 7, when the relay station 20 transmits the cell-specific reference signal only over its downlink frequency band, if a cell-specific reference signal used for channel detection in the reception demodulation scheme of the base station user includes cell-specific reference signals in the resource units denoted with 1, 2 and 3, then curves 1 and 2 in FIG. 8 illustrate a channel parameter detected at the location of the cell-specific reference signal and the channel parameter subject to two-dimension filtering respectively, which show that the channel parameter derived by the base station user will still suffer somewhat from influence due to the overlapping cell-specific reference signals over a jump frequency band; and if the cell-specific reference signal used for channel detection in a reception demodulation scheme of the base station user includes the cell-specific reference signals in the resource units denoted with 1 and 2 but not the cell-specific reference signal in the resource unit denoted with 3, then the channel parameter derived by the base station user will not suffer from any influence due to the overlapping cell-specific reference signals. Therefore optionally, the second determination means 202 is further configured to determine a minimum guard bandwidth from the reception demodulation scheme used for the mobile terminal in the cell, and the bandwidth of the guard frequency band in the downlink frequency band of the relay station 20 will not be smaller than this minimum guard bandwidth. Specifically, the minimum guard bandwidth is equal to the maximum frequency interval between a cell-specific reference signal used by a user for channel detection beyond a downlink resource block thereof and the downlink resource block thereof, for example.

Optionally, the processing apparatus 200 further includes third instruction means configured to instruct the relay station 20 to transmit a relay station-specific reference signal for downlink data demodulation of the relay station over the guard frequency band in a different pattern from the pattern of the cell-specific reference signal of the base station 10. As illustrated in FIG. 7, for example, the relay station 20 transmits, in the resource units denoted with vertical strips over its guard frequency band, relay station-specific reference signals used by the mobile terminal for reception demodulation on data over the guard frequency band. Those skilled in the art shall appreciate that the relay station 20 can alternatively transmit a relay station-specific reference signal over its entire downlink frequency band in a different pattern from the pattern of the cell-specific reference signal of the base station 10.

The Sixth Embodiment

Figure 13:
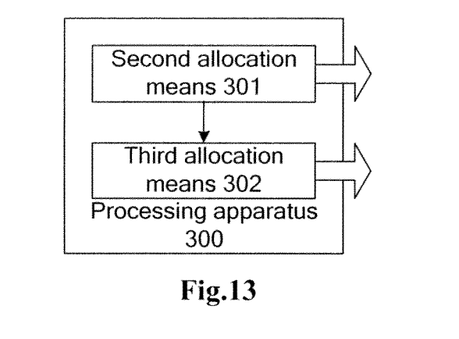
FIG. 13 illustrates a structural block diagram of a processing apparatus in a base station of a relay communication system according to an embodiment of the invention.

FIG. 13 illustrates a structural block diagram of a processing apparatus in a base station of a relay communication system according to an embodiment of the invention. As illustrated in FIG. 13, the processing apparatus 300 according to the embodiment includes second allocation means 301 and third allocation means 302. Typically the processing apparatus 300 is arranged in the base station 10. The embodiment will be described below based upon the base station 10, the relay station 20, the base station 21, the mobile terminal 30 and the processing apparatus 300 with reference to FIG. 10 and FIG. 13.

Firstly the second allocation means 301 in the processing apparatus 300 allocates to a first relay station, e.g., the relay station 20, of the base station 10 a first frequency band for downlink transmission. As illustrated in FIG. 10, for example, the first frequency band denoted with horizontal strips is allocated to the relay station 20 for downlink transmission.

Then the third allocation means 302 in the processing apparatus 300 allocates a second frequency band immediately adjacent to the first frequency band to a user remote from the first relay station, and the minimum width of the second frequency band is determined from a pattern of a cell-specific reference signal of the base station 10 and/or a reception demodulation scheme of the mobile terminal in the cell. As illustrated in FIG. 10, for example, the second frequency band denoted with slanted strips is allocated to the user remote from the relay station 20. Specifically, the minimum bandwidth of the second frequency band is equal to the maximum frequency interval between a cell-specific reference signal used for channel detection in a reception demodulation scheme of a user beyond a downlink resource block of the user and the downlink resource block thereof, for example.

When the respective relay stations transmit cell-specific reference signals only over their respective downlink frequency bands, the user for which the second frequency band is used is remote from the relay station 20, so the user and a user served by the relay station 20 will suffer from little interference due to the overlapping cell-specific reference signals during reception demodulation. Also the minimum bandwidth of the second frequency band is determined from the reception demodulation scheme of the user in the cell so that a cell-specific reference signal used for channel detection of the user for which the first frequency band is used will not go beyond the first and second frequency bands. As illustrated in FIG. 10, for example, a third frequency band is immediately adjacent to the second frequency band on the other side opposite to the first frequency band, and no matter whichever user the third frequency band is allocated, a user for which the third frequency band is used and the user for which the first frequency band is used will not suffer from any interference due to their cell-specific reference signals overlapping with each other during reception demodulation.

The user to which the second frequency band is allocated for use can be a base station user or a relay station user. The third allocation means 302 also performs a specific operation dependent upon the different user to which the second frequency band is allocated for use.

If the user to which the second frequency band is allocated for use is a relay station user, then the third allocation means 302 allocates the second frequency band directly to the relay station serving the user. The third allocation means 302 will make judgment so that if the distance of a second relay station of the base station 10 to the first relay station is above a threshold, then the second frequency band is allocated to the second relay station. For example, the distance of the relay station 21 to the relay station 20 is above a threshold, and the third allocation means 302 allocates the second frequency band to the relay station 21. This threshold is for the purpose of ensuring sufficiently small influence of the cell-specific reference signals transmitted from the two relay stations upon the performance of reception demodulation of opposite users.

If the user to which the second frequency band is allocated for use is a base station user, then the third allocation means 302 allocates the second frequency band directly to a relay station serving the user. The third allocation means 302 will further judge a condition of the user. If the distance of a mobile terminal, e.g., the mobile terminal 30, to the base station 10 is below a distance threshold or power that the base station 10 receives from the mobile terminal is above a power threshold, then the third allocation means 302 allocates the second frequency band to the mobile terminal. Both the distance threshold and the power threshold here are for the purpose of ensuring sufficiently small influence of the cell-specific reference signal of the relay station 20 upon the performance of reception demodulation of the user to which the second frequency band is allocated. More particularly, both the distance threshold and the power threshold here are determined from the cell-specific reference signal of the base station 10 and/or the reception demodulation scheme of the mobile terminal 30.

Those skilled in the art shall appreciate that the respective means as referred to in the invention can be implemented with hardware means, with functional modules in software or with hardware means integrated with functional modules in software. The respective means can be merged, decomposed and recombined according to mutual relationships between the functions performed by the respective means. For example, the second allocation means 301 and the third allocation means 302 in the processing apparatus 300 can be combined into one means.

According to the LTE-A specification, selection of a relay user is decided by an evolved Node B, a base station, and therefore the method, apparatus and device according to the invention can be applicable particularly to the LTE-A specification. Of course, those skilled in the art shall appreciate that a relay base station or a mobile terminal can initiate on its own initiative execution of the user selection function or the downlink resource allocation function.

The foregoing description is merely illustrative of the non-limiting embodiments of the invention, but the invention will not be limited to any specific system, device or protocol, and those skilled in the art can make various variations or modifications without departing from the scope of the invention as defined in the appended claims.

The invention claimed is:

1. A method for relay user selection and downlink resource allocation in a base station of a relay communication system, the method comprising:
  determining, via the base station, a relay user; and
  performing, via the base station, downlink resource allocation according to a pattern of a cell-specific reference signal thereof or a reception demodulation scheme of a mobile terminal,
    wherein when the base station selects a serving device for a mobile terminal from the base station and a relay station thereof, the method comprises:
      determining reception power of the base station and the relay station from the mobile terminal;
      comparing the difference between the power that the base station receives from the mobile terminal and the power that the relay station receives from the mobile terminal with a threshold determined from the pattern of the cell-specific reference signal of the base station or the reception demodulation scheme of the mobile terminal; and
      if the difference is above the threshold, then selecting the base station as a serving device of the mobile terminal; otherwise, selecting the relay station as a serving device of the mobile terminal,
        wherein the threshold includes a tolerance item determined from the pattern of the cell-specific reference signal of the base station.

2. A processing apparatus for relay user selection and downlink resource allocation in a base station of a relay communication system, the apparatus comprising:
  a module configured to determines a relay user; and
  a module configured to perform downlink resource allocation according to a pattern of a cell-specific reference signal thereof or a reception demodulation scheme of a mobile terminal,
    wherein when the processing apparatus selects a serving device for a mobile terminal from the base station and a relay station thereof, the processing apparatus further comprises:
      a first determination module configured to determine reception power of the base station and the relay station from the mobile terminal;
      a first comparison modlue configured to compare the difference between the power that the base station receives from the mobile terminal and the power that the relay station receives from the mobile terminal with a threshold determined from the pattern of the cell-specific reference signal of the base station or the reception demodulation scheme of the mobile terminal; and
      a selection module configured to, if the difference is above the threshold, select the base station as a serving device of the mobile terminal; otherwise, select the relay station as a serving device of the mobile terminal,
        wherein the threshold includes a tolerance item determined from the pattern of the cell-specific reference signal of the base station.

3. The processing apparatus according to claim 2, further comprising:
  a first instruction module configured to instruct the relay station to transmit a cell-specific reference signal in a downlink resource block thereof in the same pattern as the pattern of the cell-specific reference signal of the base station.

4. The processing apparatus according to claim 2, wherein the power that the relay station receives from the mobile terminal is higher than reception power that other relay stations of the base station receive from the mobile terminal.

5. A base station for a relay communication system, the base station comprising:
  at least one processor configured to determine a relay user and perform downlink resource allocation according to a pattern of a cell-specific reference signal thereof or a reception demodulation scheme of a mobile terminal,
    wherein when the at least one processor selects a serving device for a mobile terminal from the base station and a relay station thereof, the at least one processor being further configured to:
    determine reception power of the base station and the relay station from the mobile terminal;
    compare the difference between the power that the base station receives from the mobile terminal and the power that the relay station receives from the mobile terminal with a threshold determined from the pattern of the cell-specific reference signal of the base station or the reception demodulation scheme of the mobile terminal; and
    if the difference is above the threshold, then select the base station as a serving device of the mobile terminal; otherwise, select the relay station as a serving device of the mobile terminal, wherein the threshold includes a tolerance item determined from the pattern of the cell-specific reference signal of the base station.

* * * * *